(No Model.)
A. C. HOLT.
OILING DEVICE FOR VEHICLE AXLES AND WHEELS.
No. 569,045. Patented Oct. 6, 1896.
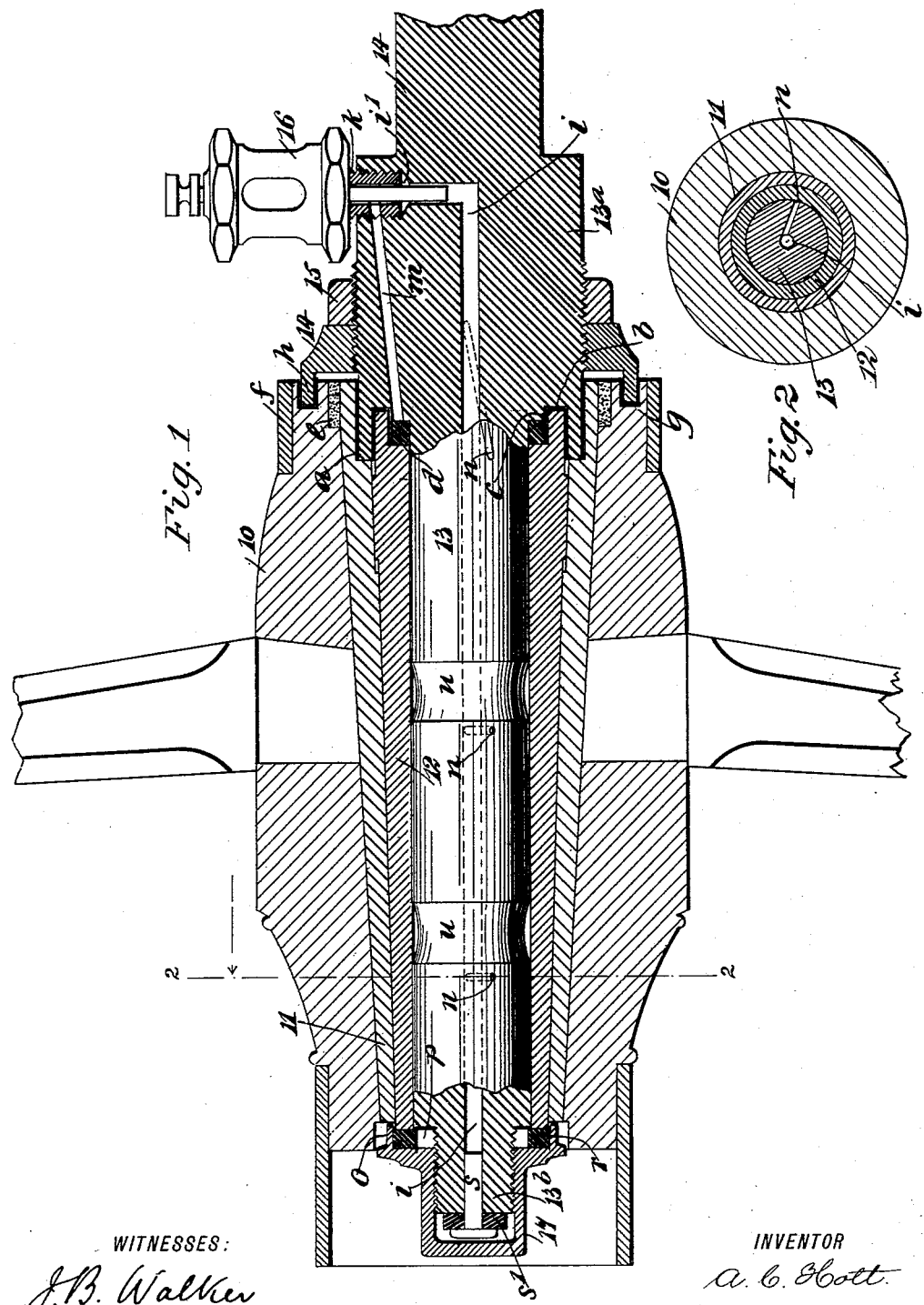
WITNESSES:
J. B. Walker
Wm. L. Patton
INVENTOR
A. C. Holt.
BY
[signature]
ATTORNEYS.

UNITED STATES PATENT OFFICE.

ADDISON C. HOLT, OF LYNCHVILLE, MAINE.

OILING DEVICE FOR VEHICLE AXLES AND WHEELS.

SPECIFICATION forming part of Letters Patent No. 569,045, dated October 6, 1896.

Application filed February 1, 1896. Serial No. 577,692. (No model.)

*To all whom it may concern:*

Be it known that I, ADDISON C. HOLT, of Lynchville, in the county of Oxford and State of Maine, have invented a new and Improved Oiling Device for Vehicle Axles and Wheels, of which the following is a full, clear, and exact description.

This invention relates to a novel oiling device for axles and wheels of vehicles, and has for its object to provide simple and reliable features of construction, which are adapted to automatically lubricate the axle spindles and boxes of the wheels for a considerable period of time without requiring the replenishment of the lubricant, and that will also dispense with the removal of the vehicle-wheels at any time for the purpose of lubrication.

The invention essentially consists in the novel construction and combination of parts, as is hereinafter described, and defined in the claim.

Reference is to be had to the accompanying drawings, forming a part of this specification, in which similar characters of reference indicate corresponding parts in both figures.

Figure 1 is a longitudinal sectional view of a vehicle-hub, and a partly-sectional side view of an axle-spindle, embodying the features of improvement; and Fig. 2 is a transverse sectional view on the line 2 2 in Fig. 1.

The improved oiling device comprises novel features of construction in the axle-spindles and also in the wheel-hubs of a vehicle, which will be connectedly described.

The vehicle-wheel hub 10 may be of any preferred design and dimensions, as the improvements are applicable to light or heavy vehicles.

As shown, a sleeve 11, that is suitably tapered, is forcibly inserted in an axial perforation in the hub, which is correspondingly tapered in the bore from the rear end to the front end, the sleeve being provided to receive and hold securely a spindle-box 12.

The box 12 fits neatly the coniform bore of the sleeve 11, and has a cylindrical perforation formed axially through it to receive the neatly-fitting spindle 13, that is produced on an end of the axle 14, it being understood that in completed form the axle has a similar spindle on each end.

The spindle 13 is thickened at the portion 13$^a$, which joins the axle, and this portion of increased diameter is loosely inserted at its forward end in a counterbore $a$, formed to receive it in the rear end of the sleeve 11.

An annular channel $b$ is formed in the front wall of the thickened portion 13$^a$, which latter for convenience will hereinafter be termed the "spindle-stub," and, as represented in Fig. 1, the channel $b$ has such proportionate width and depth that the rear end of the box 12 will be received therein, the latter having a close running engagement with the walls of the channel.

A counterbore is produced in the rear end of the spindle-box 12, as indicated at $c$ in Fig. 1, and in said annular recess a packing-ring $d$, of any suitable material, is seated, which ring or washer has contact with the spindle-hub 13$^a$ and with the box 12, sealing the joint between said parts.

There is a circular groove of proper depth formed in the rear end of the hub 10 around the adjacent end of the sleeve 11, and a filling $e$, of a suitable cement which is oil-resistant, is introduced within the groove mentioned, and will prevent the capillary introduction of oil between the hub and sleeve, which, if permitted, would probably loosen the frictional contact of the named parts.

Between the rear hub-band $f$ and joint $e$ the end of the hub is annularly grooved, as shown at $g$ in Fig. 1.

The periphery of the spindle-stub 13$^a$ is threaded, and on said threaded portion is screwed a sealing-collar 14, having on its side nearest the rear end of the hub a laterally-extending flange $h$ of circular form, the diameter and thickness of which conforms with that of the groove $g$, in which the said flange is embedded, the sides and inner edge of the flange having running contact with the bottom and sides of the groove when the collar is correctly adjusted. Another collar 15 is screwed on the spindle-stub, and when forced against the collar 14 serves as a jam-nut to prevent rotative movement of either collar. It will be evident that when the flange on the collar 14 is correctly embedded the space between the hub 10 and collar 14 will be hermetically sealed thereby, so that entrance of dust will be practically prevented.

The spindle 13 is axially perforated from the front end to a point near the rear end of the spindle-stub 13ª, a proper diameter being afforded said perforation $i$ for the free conveyance of liquid lubricant.

At the rear terminal of the axial perforation $i$ it is intersected by a perforation $i'$, that is bored from the periphery of the spindle-stub 13ª a suitable distance from the collars 14 15. The perforation $i'$ is enlarged at and near the surface of the stub it is formed in, and the said counterbored portion of the perforation is threaded for reception of the threaded shank $k$ on the oil-cup 16. The oil-cup may be of any approved style, preference being given to one of the automatic-feeding type, which will only supply the liquid lubricant it holds when the vehicle is in motion.

From a lateral perforation in the shank $k$ of the oil-cup a supplementary oil-passage $m$ is extended longitudinally in the spindle-stub 13ª, cutting through the front channeled wall of the stub opposite the packing-ring $d$. At correct intervals a suitable number of lateral feed-passages $n$ for lubricating liquid are extended from the central oil-passage $i$, so as to cut through the outer surface of the spindle 13.

Preferably there are three of the lateral oil-passages $n$ provided, one near the front end of the spindle and one near the longitudinal center, the remaining passage being located partly in the spindle and partly in the stub 13ª. The forward and middle passages $n$ are preferably inclined so as to project tangentially outward from the axial bore $i$ of the spindle 13, as shown plainly in Fig. 2.

The rear lateral passage $n$ is projected from a suitable point in the center oil-passage $i$, located in the stub 13ª rearward of the joint ring or washer $d$, and from the said point of intersection the passage $n$ trends forward and outward, so as to cut through the peripheral surface of the spindle in front of the joint-washer $d$, so that the said rear lateral passage will not weaken the spindle at its point of junction with the spindle-stub.

The front end of the spindle 13 is extended sufficiently beyond the forward end of the spindle-box 12 to afford a screw-stem 13ᵇ, the latter having less diameter than the spindle, and on said screw-cut stem a cap-nut 17 is adapted for threaded engagement.

It will be noticed that the nut 17 is furnished with a circumferential flange $o$, that projects into a channel formed in the front end of the hub 10 when said nut is screwed upon the stem 13ᵇ, and in the shallow chamber $p$, afforded by provision of the flange $o$, a joint-washer $r$ is seated, which latter will have enforced contact with the forward end of the spindle-box 12 when the nut 17 is screwed so as to jam the free edge of its flange $o$ on the front end of the sleeve 11, as shown in Fig. 1.

In the forward end of the axial oil-passage $i$ the cylindric stem $s$ of a small valve is fitted so as to be removable by any convenient implement, this stem having a flanged head that the joint-washer $s'$ will contact with when the washer is placed on the stem and slid thereon. The washer $s'$ is formed of any proper material, leather, for example, and the close contact had by the inner surface of the cap of the nut 17 will cause said washer, that is, the valve-body, to seal the front end of the axial oil-passage $i$, which it will continue to do if the nut is removed and wheel-hub 10 displaced from the spindle for any purpose.

In operation it will be apparent that the correct adjustment of the cap-nut 17 will draw the wheel-hub 10 into correct position on the spindle 13, and when the vehicle is moved oil will be automatically fed from the cup 16 into the axial oil-passage $i$ and thence through the lateral oil-passages $n$ to lubricate the working surface of the spindle 13.

It will be seen that dust or any external impurities are perfectly excluded from the joint between the spindle and its box, as the flanged collar 14 seals the inner end of the spindle, and should any dust or grit enter the space between the collar and rear end of the hub 10 and thence pass around the front channeled end of the spindle-stub 13ª the joint-washer $d$ will arrest such impurity and prevent it from reaching the spindle.

There are shallow peripheral grooves $u$ formed in the spindle 13 at spaced distances apart and from the ends thereof, which will receive any residuum that may form from the lubricant; but, if the latter is of good quality, when worn so as to be ineffective as a lubricant the waste oil will work out through the joint at the front of the spindle and may be wiped off as it appears.

The constant feeding of the oil from cup 16 when the vehicle is in motion tends to keep the spindle clean, so that the vehicle-wheels need not at any time be removed for the purpose of lubrication.

The supplementary oil-feeding passage $m$ is provided to lubricate the spindle by infiltration of oil through or around the washer $d$, if at any time the axial passage $i$ and lateral passages $n$ should become clogged from impurities in the lubricant; but said passage will be unnecessary if the lubricating material is of good quality and not liable to produce gummy residuum.

Having thus described my invention, I claim as new and desire to secure by Letters Patent—

The combination of an axially-recessed hub, a sleeve in said hub, a spindle having an enlarged portion, the forward end of said enlarged portion being inserted in a counterbore in said sleeve, a collar having screw-thread engagement with said enlarged portion of the spindle, the said collar having an annular flange engaging in an annular channel in the rear end portion of the hub, an oil-cup communicating with a vertically-disposed oil-passage formed in the enlarged portion of the spindle, the said oil-passage communicating with an oil-passage extending longitudinally through the center of the spindle, which has lateral feed-passages, the said vertical oil-passage also communicating with a smaller oil-passage arranged above the longitudinal oil-passage, the said upper oil-passage communicating at its end with a packing-ring in the hub-box, a plug-valve for the end of said longitudinal passage through the center of the spindle, a screw-cap engaging over said plug-valve, the said screw-cap engaging with the reduced screw-threaded portion of the spindle and having a flange engaging against the outer end of the hub, and a packing-ring engaged between the flange of said screw-cap and the end of the packing in the hub, substantially as specified.

ADDISON C. HOLT.

Witnesses:
CHARLES C. FLANDERS,
CHARLES L. BARTLETT.